United States Patent Office 3,259,944
Patented July 12, 1966

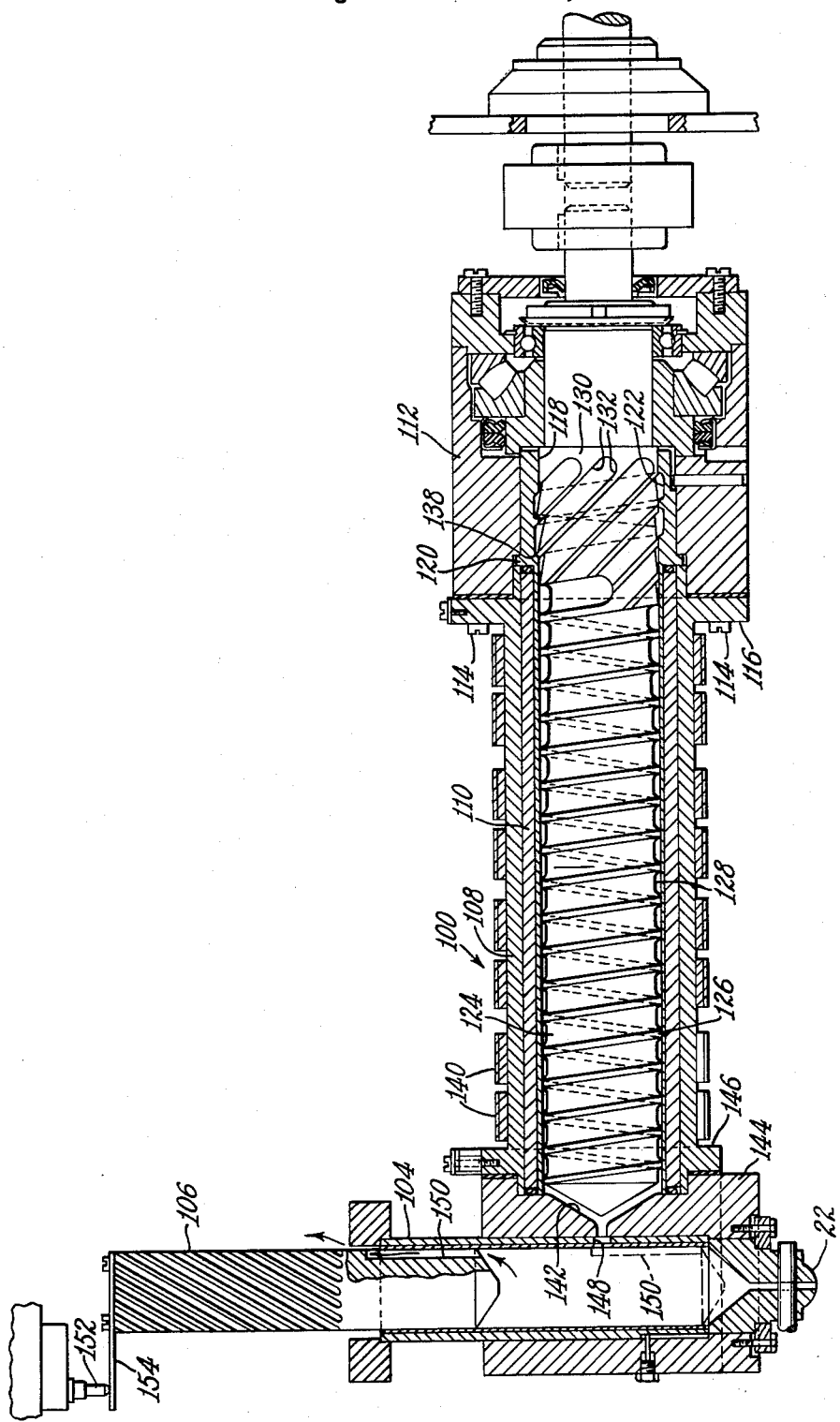

3,259,944
MOLD CHARGING MEANS
Donald B. McIlvin, Danvers, Mass., assignor to United Shoe Machinery Corporation, Boston, Mass., a corporation of New Jersey
Application Feb. 5, 1965, Ser. No. 430,632, which is a division of application Ser. No. 231,222, Oct. 17, 1962, now Patent No. 3,200,438, dated Aug. 10, 1965. Divided and this application July 27, 1965, Ser. No. 475,082
4 Claims. (Cl. 18—30)

This is a division of application Serial No. 430,632, filed February 5, 1965, which is a division of application Serial No. 231,222, filed October 17, 1962, now Patent No. 3,200,438, in the name of Donald B. McIlvin.

This invention relates to injection molding machines of the type disclosed in United States Letters Patent No. 3,006,032, granted October 31, 1961, on an application filed in the names of Baker, Berggren, McIlvin and Spencer. It is to be understood, however, that the invention is not limited in scope to machines of this type, but in certain respects is applicable to injection molding machines generally.

It is an object of the present invention to provide means for automatically terminating the injection of fluid plastic material into the mold charging means.

It is a further object of the invention to provide means permitting the escape of the fluid plastic from the mold charging means in the event of failure of the injection terminating means, for the purpose of obviating possible damage to the machine by an increase in pressure of the fluid plastic in the mold charging means.

With the above and other objects in view, as will hereinafter appear, the present invention contemplates the provision, in an injection molding machine, of improved mold charging means. More particularly, the illustrated machine is provided an injection cylinder having a piston disposed therein. At one end of the cylinder there is located an injection nozzle through which the piston discharges fluid plastic into a mold cavity. Means are provided for introducing fluid plastic into the cylinder, which causes retraction of the piston in the cylinder to a rest position adjacent the end of the cylinder opposite the dicharge end. Means are further provided which are operated by the retraction of the cylinder and which serve to terminate the introduction of fluid plastic into the cylinder. In addition, the cylinder is provided with an escape passage through which fluid plastic can flow from the cylinder in the event of failure of the means for causing the operation of the extruding means to terminate.

These, and other features of the invention, will now be described with reference to the accompanying drawings and pointed out in the appended claims.

In the drawings,

FIG. 1 is a plan view of the mold charging mechanism, mainly in section on a plane common to the axis of the extruder.

Referring to FIG. 1, the illustrated mechanism includes an extruder 100 of the auger type which receives plastic in the form of a continuous tape from a reel (not shown) and, after a milling application thereon by the extruder, reduces the plastic to fluid condition and transmits the then fluid plastic to a cylinder 104 in which operates a piston 106 to expel the plastic through an injection nozzle 22 into the mold cavity.

The illustrative extruding mechanism comprises a casing 108 in which is mounted a sleeve 110 of wear resisting material. At its right end portion, as viewed in FIG. 1, the casing is secured to a block 112 by screws 114 extending through a flange 116 formed in the casing. The block 112 is bored to receive a short sleeve 118 and counterbored to receive an outwardly extending flange 120 of the sleeve 118 and the end portions of the casing 108 and the sleeve 110. The short sleeve 118 has formed in its inner surface a helical groove 122 of decreasing depth into which a length of tape is fed. The extruder is provided with a rotary screw 124 having a single thread 126, the flights of which are spaced from each other to an extent slightly greater than the width of the tape. A helical groove 128 between the flights of the thread decreases in depth from the receiving end of the screw to a point near the center of the groove lengthwise thereto and proceeds from that point downstream to the delivery end of the screw at approximately a uniform depth.

At its receiving, or right hand end as seen in FIG. 1, the screw 124 has a cylindrical head 130 which is provided with a plurality of spaced teeth 132 helically arranged about the head 130. The teeth 132 are constructed and arranged to provide a cutting edge whereby the teeth feed the tape through the groove 122 and to a stationary cutting edge 138 formed at the terminus of the groove 122 where the tape is cut into short lengths by the shearing action of the teeth 132 against the stationary cutter 138. After cutting the tape into short lengths the teeth 132 operate to feed the short lengths downstream to the screw 124. The screw continues the feeding of the short lengths of tape and applies to the tape a vigorous milling or plasticating action which causes an increase in its temperature sufficient to reduce the plastic from a solid to a fluid state. In order to counteract any loss of heat from the plastic by radiation through the cylinder 104, suitable heating bands 140 are arranged about the outer surface of the casing 108. At the discharging end of the auger the fluid plastic flows into a shallow conical recess 142 formed in a block 144 which provides a union between the extrusion mechanism and the injection mechanism. The block 144 is counterbored to receive the extremity of the casing 108 which has an outwardly extending flange 146. The recess 142 communicates with a port 148 formed in the cylinder 104. When the piston 106 is in its advanced position, indicated by broken lines in FIG. 1, fluid plastic flows into the downstream end portion of the cylinder 104 and into the nozzle 22 through a longitudinal groove 150 formed in the piston 106 and communicating with the port 148.

In the operation of the extruding and ejecting mechanism the piston 106 is retracted into the position illustrated by full lines in FIG. 1 by the pressure of the fluid plastic extruded into the cylinder 104. The retracting movement of the piston 106 is arrested upon the termination of the rotation of the screw 124. In the normal operation of the machine, rotation of the screw is caused to terminate by the operation of a microswitch 152 by a plate 154 secured to the rear end portion of the piston 106. In the event of a failure of the microswitch 152 to operate, or a failure of the extruder clutch (not shown) to open, rearward movement of the piston 106 continues briefly until the rear end portion of the groove 150 passes beyond the end wall of the cylinder 104, thus permitting the escape of fluid plastic from the rear end portion of the groove 150 and obviating possible damage to the machine by an increase in pressure of fluid plastic in the cylinder 104.

Having thus described my invention, what I claim as new and desire to secure by Letters Patent of the United States is:

1. An injection molding machine having in combination, an injection cylinder, a piston mounted in the cylinder, an injection nozzle at the discharge end of the cylinder through which the piston expels fluid plastic into a mold cavity, means for introducing fluid plastic into the cylinder and thus causing retraction of the piston in the cylinder to a normal rest position adjacent the end opposite said discharge end, and means operated by such retraction of the piston for causing the operation of the introducing means to terminate, the piston and cylinder assembly being characterized by an escape passage through which fluid plastic can flow from the cylinder in the event of a failure of the means for causing the operation of the introducing means to terminate accompanied by a consequent retracting movement of the piston beyond its normal rest position.

2. An injection molding machine having in combination, an injection cylinder, a piston mounted in the cylinder, an injection nozzle at the discharge end of the cylinder through which the piston expels fluid plastic into a mold cavity, means for introducing fluid plastic into the cylinder and thus causing retraction of the piston in the cylinder to a normal rest position adjacent the end opposite said discharge end, and means operated by such retraction of the piston for causing the operation of the introducing means to terminate, the piston and cylinder assembly being characterized by an escape passage formed in the piston and arranged to permit flow of fluid plastic from the cylinder in the event of a failure of the means for causing the operation of the introducing means to terminate and a consequent retracting movement of the piston beyond its normal rest position.

3. In an injection molding machine, the combination with means providing a mold cavity of means for charging the mold cavity comprising an extruder auger, a sleeve in which the auger operates, said sleeve being constructed and arranged to receive solid plastic from a suitable source, said extruder auger having adjacent to its discharge end a section in which solid plastic fed to the sleeve is converted to a fluid state, an injection cylinder into which fluid plastic is introduced by the extruder auger, an injection piston mounted in the cylinder and arranged to be retracted to a normal rest position adjacent the end opposite said discharge and by the introduction of fluid plastic into the injection cylinder by the auger, means operated by such retraction of the injection piston for causing the operation of the auger to terminate when the piston has been retracted into its normal rest position, the injection piston and cylinder assembly being characterized by an escape passage through which fluid plastic can flow from the injection cylinder in the event of a failure of the means for causing the operation of the auger to terminate accompanied by a consequent retractive movement of the injection piston beyond its normal rest position.

4. In an injection molding machine, the combination with means providing a mold cavity of means for charging the mold cavity comprising an extruder auger, a sleeve in which the auger operates, a head mounted to rotate in the sleeve, a cutter carried by the head, a stationary cutter in the sleeve arranged to cooperate with the cutter carried by the head to shear off an end portion of a length of plastic fed into the sleeve, said extruder auger having adjacent to its discharge end a section in which solid fragmented plastic provided by the cutters is reduced to a fluid state, an injection cylinder into which fluid plastic is introduced by the extruder auger, an injection piston mounted in the cylinder and arranged to be retracted to a normal rest position adjacent the end opposite said discharge end by the introduction of fluid plastic into the injection cylinder by the auger, means operated by such retraction of the injection piston for causing the operation of the auger to terminate when the piston has been retracted into its normal rest position, the injection piston cylinder assembly being characterized by an escape passage through which fluid plastic can flow from the injection cylinder in the event of a failure of the means for causing the operation of the auger to terminate accompanied by a consequent retractive movement of the injection piston beyond its normal rest position.

References Cited by the Examiner
UNITED STATES PATENTS

| | | | |
|---|---|---|---|
| 2,705,342 | 4/1955 | Hendry | 18—30 |
| 2,746,089 | 5/1956 | Hendry | 18—30 |
| 2,836,851 | 6/1958 | Holt. | |

J. SPENCER OVERHOLSER, *Primary Examiner.*

W. L. McBAY, *Assistant Examiner.*